United States Patent [19]

Mollet et al.

[11] Patent Number: 5,086,216
[45] Date of Patent: Feb. 4, 1992

[54] MEMORY CARD WITH FUSES AND A SYSTEM FOR HANDLING SUCH MEMORY CARDS

[75] Inventors: Jean P. Mollet, La Celle Saint Cloud; René Rose, Voisin le Bretonneux, both of France

[73] Assignee: Schlumberger Industries, Montrouge, France

[21] Appl. No.: 371,768

[22] Filed: Jun. 27, 1989

[30] Foreign Application Priority Data

Jun. 28, 1988 [FR] France ................... 8808640

[51] Int. Cl.$^5$ .................. G06K 19/00; G06K 19/067
[52] U.S. Cl. .................... 235/492; 235/375
[58] Field of Search ............... 235/492, 488, 487, 380, 235/375; 365/96

[56] References Cited

U.S. PATENT DOCUMENTS

| | | | |
|---|---|---|---|
| 3,702,464 | 11/1972 | Castrucci . | |
| 3,792,319 | 2/1974 | Tsang | 365/96 |
| 3,863,261 | 1/1975 | Taylor | 365/96 |
| 3,872,450 | 3/1975 | Reynolds | 365/96 |
| 3,877,049 | 4/1975 | Buckley | 365/36 |
| 3,976,983 | 8/1976 | Moussie | 365/96 |
| 4,092,524 | 5/1978 | Moreno | 235/487 |
| 4,112,505 | 9/1978 | Uuval et al. | 365/96 |
| 4,501,958 | 2/1985 | Glize et al. | 235/382 |
| 4,767,920 | 8/1988 | Kitta et al. | 235/380 |
| 4,773,046 | 9/1988 | Akaogi et al. | 365/96 |
| 4,841,133 | 6/1989 | Gercekci et al. | 235/380 |

FOREIGN PATENT DOCUMENTS

| | | |
|---|---|---|
| 144533 | 6/1985 | European Pat. Off. . |
| 577334 | 8/1986 | France . |
| 62-36800 | 2/1987 | Japan . |

OTHER PUBLICATIONS

Smart Cards, The New Bank Cards, by Jerome Svigals Macmillan, 1987.

*Primary Examiner*—Stuart S. Levy
*Assistant Examiner*—Richard M. Weinberg
*Attorney, Agent, or Firm*—Frishauf, Holtz, Goodman & Woodward

[57] ABSTRACT

A memory card which does not utilize a semiconductor chip to store information. A plurality of discrete electrical components, such as fuses, is provided in the card which has the same shape and the same external contact tabs as a standard electronic memory card with a semiconductor chip. Information is written in the memory card by selectively transforming an initial electrical conduction state of the fuses into another, irreversible electrical conduction state which can be read by suitable apparatus.

3 Claims, 5 Drawing Sheets

MEMORY CARD WITH FUSES AND A SYSTEM FOR HANDLING SUCH MEMORY CARDS

The present invention relates to data media, in particular memory cards, and to a system of handling such data media.

Electronic memory cards are now well known. They essentially comprise a semiconductor chip in which an integrated circuit is formed, with the chip being fixed in a card body made of plastic.

For the simplest applications of such cards, e.g. for paying telephone call charges, the integrated circuit is essentially constituted by a non-volatile memory in which a memory cell is "burnt" each time a telephone charge unit has been spent.

Such cards are much more secure than cards with magnetic tracks since the "burning" of a memory cell is irreversible whereas it is possible to falsify the data recorded on a magnetic track. However, in comparison with magnetic cards, they suffer from the drawback of being substantially more expensive, and this extra cost is largely related to the cost of the integrated circuits contained therein. Such extra cost can be particularly difficult to accept when the monetary value represented by a card is low and the card is incapable of being reloaded with credit.

Further, a system for supplying goods or services using cards also includes processing devices in which cards are inserted and which authorize or refuse the supply of goods or service to a card holder. An example is constituted by public pay phones actuated by the insertion of a card. These devices include a device for reading from and writing to cards, which device forms an integral portion of the machine for providing goods or service. Such devices may be fairly expensive.

When an organization seeks to install a complete system for supplying goods or services on the basis of electronic memory cards, the organization must not only bear the cost of acquiring and installing the machines that supply the goods or service, but also the cost of buying a large number of memory cards to be put into circulation. However, there is no guarantee that when such a system is installed in a new region or in a new country that it will be accepted by users.

It would therefore be advantageous to be able to offer organizations seeking to install such a card-operated system for providing goods or service with a system in which the cards are quite noticeably cheaper to manufacture than are current electronic memory cards but in which the cards have exactly the same external appearance and external characteristics as genuine electronic memory cards so as to be capable of being used in card processing devices which are identical to or substantially identical to those which operate in conjunction with genuine electronic memory cards.

An object of the invention is to provide data media and a system for handling cards which satisfy the above-specified conditions.

According to the invention, this object is achieved by a data medium comprising a card body having a plane main face and n external electrical contact tabs in said main face, characterized in that its external appearance is the same as that of an electronic memory card and in that it includes at least n−1 discrete electrical components connected to said tabs by conducting portions, said electrical components and said conducting portions being embedded in the body of the card, with each electrical component having an initial electrical conduction state and at least one second irreversible electrical conduction state, said second conduction state being taken up when a predetermined electrical write signal is applied between at least two of said tabs associated with said electrical component.

A system for handling data media of the above-described type includes at least one device for processing the data media, said device comprising a processing circuit, a connection assembly having n electrical contacts for establishing an electrical connection between said processing circuit and each of the contact tabs of a data medium, when said medium is in a processing position, said processing circuit including controllable means for applying to each pair of electrical contacts either said predetermined write electrical signal or else a read electrical signal which is not suitable for switching an electrical component from its initial conduction state to its second conduction state, and means for determining the conduction state of an electrical component when said read electrical signal is applied thereto.

The invention will be better understood from reading the following description of embodiments described by way of nonlimiting example. The description refers to the accompanying drawings, in which.

Figure 1:
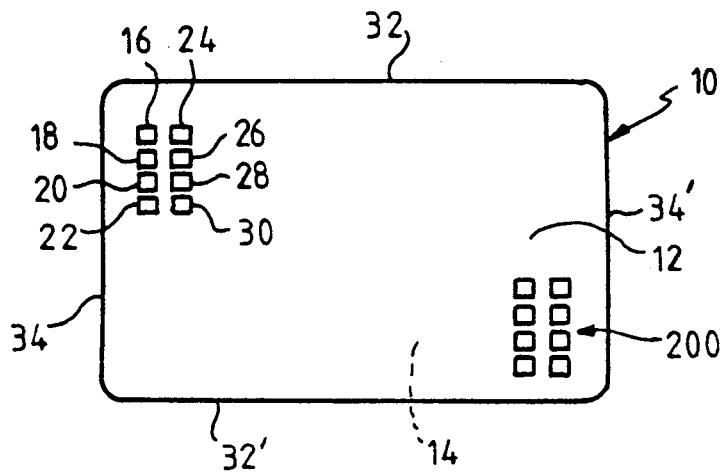
FIG. 1 shows a card.

FIG. 1 shows a memory card in accordance with the invention. It comprises a body 10 made of plastic material (PVC or ABS, for example) which is generally rectangular in shape having two main faces: a face 12 which is visible in FIG. 1; and a face 14 which is not visible. External electrical contact tabs 16 to 30 are disposed in the face 12 of the card and are connected to an electrical circuit which is mounted inside the card. When the card is inserted in a card reader, these external tabs are intended to be used for setting up an electrical connection between the circuit in the card and the processing circuit of the card reader.

In accordance with the invention, the shape of the card body and the dimensions and positions of the external tabs 16 to 30 are exactly identical to the corresponding features of an electronic memory card. In other words, externally, a card in accordance with the invention is identical to a genuine electronic memory card. In France, in particular, such electronic memory cards must satisfy either the international (ISO) standard or else the French (AFNOR) standard. These standards define, in particular, the dimensions of the card body, the dimensions of the external tabs 16 to 30, and their positions relative to the edges 32 and 34 of the card body. If a card in accordance with the invention is intended for use in France it will therefore comply with one or other of these two standards. However, the thickness of the card body is not a critical parameter for utilization of a card in a reader complying with the above-specified standards. The thickness of the body of a card in accordance with the invention can thus deviate, to some extent, from the standard. The only constraint from this point of view is that the card must be capable of being processed in a standard card reader.

As mentioned above, according to the invention, the memory circuit installed in a card body and connected to external tabs 16 to 30 is not formed in a semiconductor chip but is instead constituted by an electrical circuit built up from discrete electrical components which are connected to the external tabs by conductor components. Each electrical component for constituting one or more memory cells is preferably connected to two external tabs. Such an electrical component has an initial electrical conduction state, and this initial state can be changed by applying an appropriate electrical signal to the external tabs associated with said electrical component, which signal is analogous to a write signal. The electrical component is chosen in such a manner that once it has taken up a modified conduction state, it cannot be returned to the initial conduction state.

In addition, each electrical component is constituted and mounted in such a manner that it is possible to determine whether the electrical component is in its initial state or in its modified conduction state by applying an appropriate "read" signal to the tabs associated with the electrical component. Each electrical component is preferably associated with a pair of external tabs. The conduction state of an electrical component can be changed by applying an electrical write signal to the pair of tabs. It is also possible to find out whether an electrical component is in its initial state or in its modified state by applying an electrical read signal to the pair of tabs.

Before describing several embodiments of the electrical circuit in a card, we describe a device for processing cards (referred to below as a card reader) and usable with cards in accordance with the invention.

Figure 2:
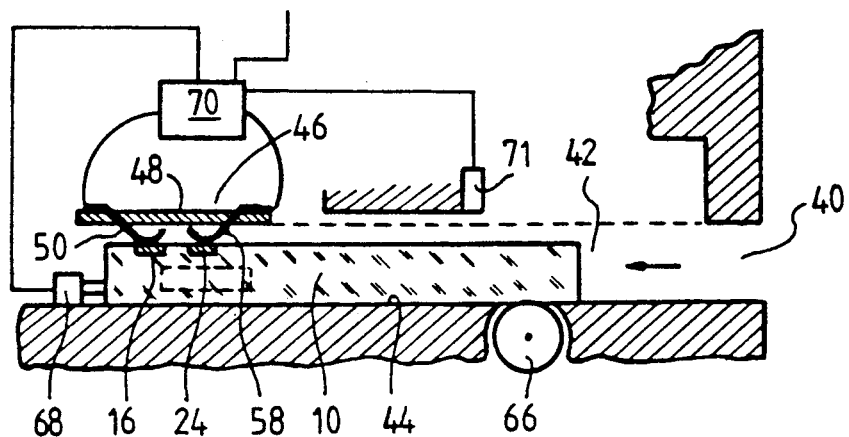
FIG. 2 shows a card reader in vertical section.
Figure 3:
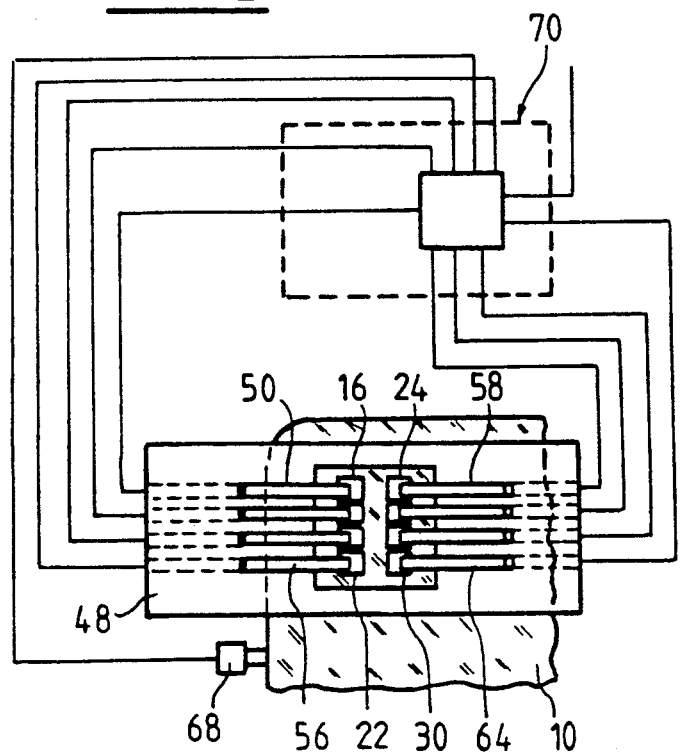
FIG. 3 is a fragmentary plan view of the FIG. 2 card reader.

FIGS. 2 and 3 show the general organization of such a reader, which organization is identical to that of a reader for electronic memory cards. The reader includes a card insertion slot 40 which is extended by card guide passage 42. The passage 42 is delimited by a floor 44 and by side walls, not shown. Inside the passage 42 there is a connector 46. The connector 46 essentially comprises an insulating support 48 having flexible conducting blades 50 to 64 mounted thereon. The number of blades is equal to the number of external tabs on the card, i.e. eight in the example described.

The card is brought to the processing position either manually or else by a drive system which is represented in FIG. 2 by a wheel 66. When the card is in the processing position, each external tab 16 to 30 of the card 10 is in electrical contact with one of the conducting blades. A detector 68 for detecting the presence of a card is also mounted in the passage 42 to deliver a signal when the card has arrived in the processing position. The eight flexible blades 50 to 64 and the detector 68 are connected to a processing circuit 70 by electrical connections. The processing circuit 70 includes portions which already exist in electronic memory card readers, and portions which are specific to the present invention and which are described below with reference to FIG. 4.

Further, since the reader must be capable of processing standard cards as well as cards in accordance with the invention, cards of the invention are provided with an optical or a magnetic mark on their faces 12. The reader is provided with an appropriate detector 71 which triggers the special process of the invention when a card of the invention is inserted into the reader.

Figure 4:
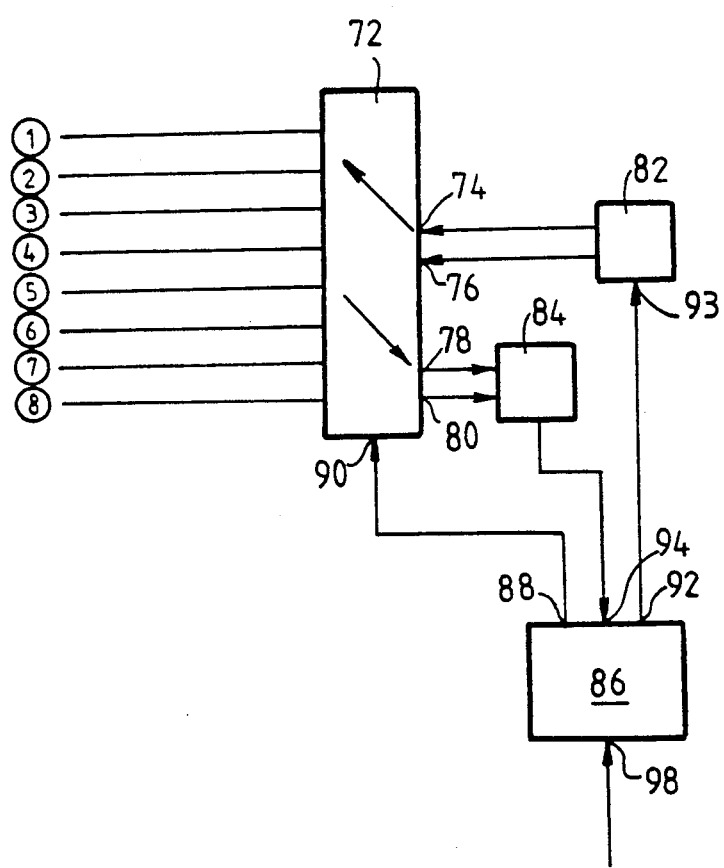
FIG. 4 is a circuit diagram showing the processing circuit of the card reader.

In FIG. 4, the digits 1 to 8 are used, by way of simplification, to designate conductors coming from conducting blades 50 to 64, which conducting blades are themselves in electrical contact with the external tabs 16 to 30 when a card is in the read position. Lines 1 to 8 are connected to corresponding terminals of a connection circuit 72. The connection circuit 72 is a both-way circuit. It serves firstly to connect feed terminals 74 and 76 to any pair of the conductors 1 to 8, and secondly to connect any pair of the conductors 1 to 8 to two measurement terminals 78 and 80. The feed terminals 74 and 76 are connected to a controllable voltage source 82, and the measurement terminals 78 and 80 are connected to a voltage measuring circuit 84.

A control circuit 86 has a first output 88 which is connected to a control input 90 of the connection circuit 72, and a second output 92 which is connected to a control input 94 of the voltage source 82. The control circuit 86 also includes an input 94 via which it receives the result of the measurement performed by the circuit 84.

The circuit 82 is suitable for delivering a first or "read" voltage $V_L$ which is too small to change the conduction state of one of the electrical components in the card, and at least one second or "write" voltage $V_E$ suitable for changing the conduction state of an electrical component in the card.

The card reader operates as follows. When a card 10 is inserted into the reader and reaches the processing position, the detector 68 sends a signal to the processing circuit 70, and more precisely to the control circuit 86 to trigger the following operations. The circuit 82 is controlled to apply the read voltage $V_L$ to the terminals 74 and 76, and the connection circuit 72 is controlled to connect the terminals 74, 76 and 78, 80 simultaneously to pairs of the lines 1 to 8 in a pre-established order referred to as the card write order. Each time the read voltage $V_L$ is applied to a pair of contact tabs, the measuring device 84 sends a signal to the control circuit 86 indicating whether the electrical component in the card is in the modified state or in the initial state. As soon as the signal delivered by the measuring circuit indicates that the electrical element is in the initial state, the connection circuit 72 is kept in position, and on receiving a write signal via its input 98, the control circuit 86 can cause one of the electrical components to be "burnt", e.g. in order to authorize obtaining one telephone charge unit. On receiving the write signal, the control circuit 86 uses its output 92 to control the voltage source 82 so that it delivers a write voltage $V_E$. This causes the electrical component selected by the connection circuit 72 to switch from its initial state to the modified state.

The control circuit 86 then controls the voltage generator 82 to deliver the read voltage $V_L$ so as to verify that the electrical component has indeed had its conduction state changed. Thereafter, the circuit 82 is controlled to stop delivering any voltage and the connection circuit is controlled to connect to the next pair of lines. It is now ready to "burn" another electrical component in the card.

Figure 5:
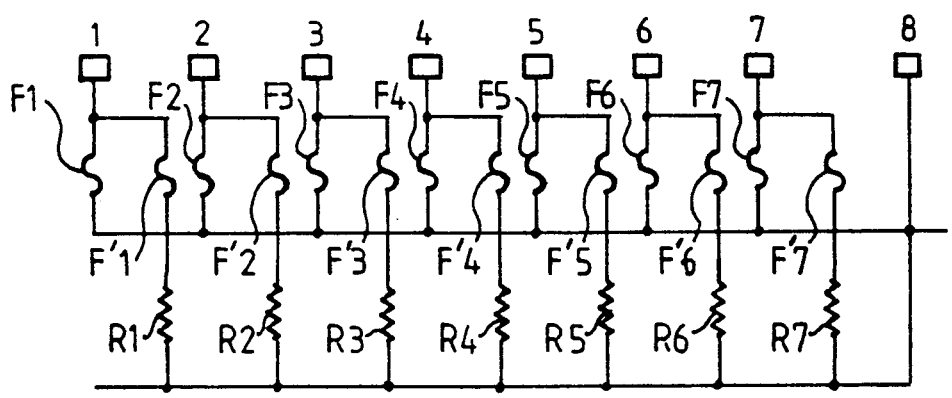
FIG. 5 is a circuit diagram of the electrical module in the card.

FIG. 5 shows a first embodiment of the electrical circuit in the card, and thus of the electrical components and the connection components. In this figure, the digits 1 to 8 are again used to designate the external electrical connection tabs which are in fact located on the card body in the positions of external tabs 16 to 30 shown in FIG. 1. Each electrical component is constituted by a fuse $F_i$ which is calibrated to remain intact (initial state) when the read voltage $V_L$ is applied thereto and to melt when the write voltage $V_E$ is applied thereto. Each of fuses $F_1$ to $F_7$ is connected between tab 8 and one of the tabs 1 to 7. Since the card would then only contain seven memory locations, it is preferable for the electrical circuit to include a second series of fuses $F'_1$ to $F'_7$, with each of these fuses being connected between the tab 8 and one of the tabs 1 to 7 via a respective resistance $R_1$ to $R_7$ connected in series with each fuse $F'_1$ to $F'_7$. The resistances $R_1$ to $R_7$ are defined in such a manner that, when the write voltage $V_E$ is applied, the current passing through one of the fuses $F_i$ is sufficient to melt the fuse but the current flowing through the corresponding fuse $F'_i$ is insufficient to obtain the same effect. The fuses $F'_i$ are "burnt" by applying a second write voltage $V'_E$ to the corresponding tabs, which second voltage is high enough for the current which passes through the fuse $F'_i$ and its resistance $R_i$ to cause the fuse to melt. With this architecture of electrical circuit, it is necessary for the voltage source 82 in the card reader to be additionally capable of delivering the second write voltage $V'_E$. The order of writing consists in burning the fuses $F_i$ initially and then subsequently burning the fuses $F'_i$. It is also necessary to provide two read voltages: $V_L$ for the fuses $F_i$, and $V'_L$ for the fuses $F'_i$. The second read voltage $V'_L$ made identical to the first write voltage $V_E$.

In order to increase the number of memory locations, it is possible to provide a third series of fuses $F''_i$ each mounted between terminal 8 and one of the terminals 1 to 7 and a respective resistance $R'_i$ connected to the terminal i, with each fuse $F''_i$ being connected in series with the corresponding resistance $R'_i$. The resistances $R'_i$ are preferably all equal. Writing is performed at a voltage $V''_E$ and reading with a voltage $V''_L$.

Figure 6A:
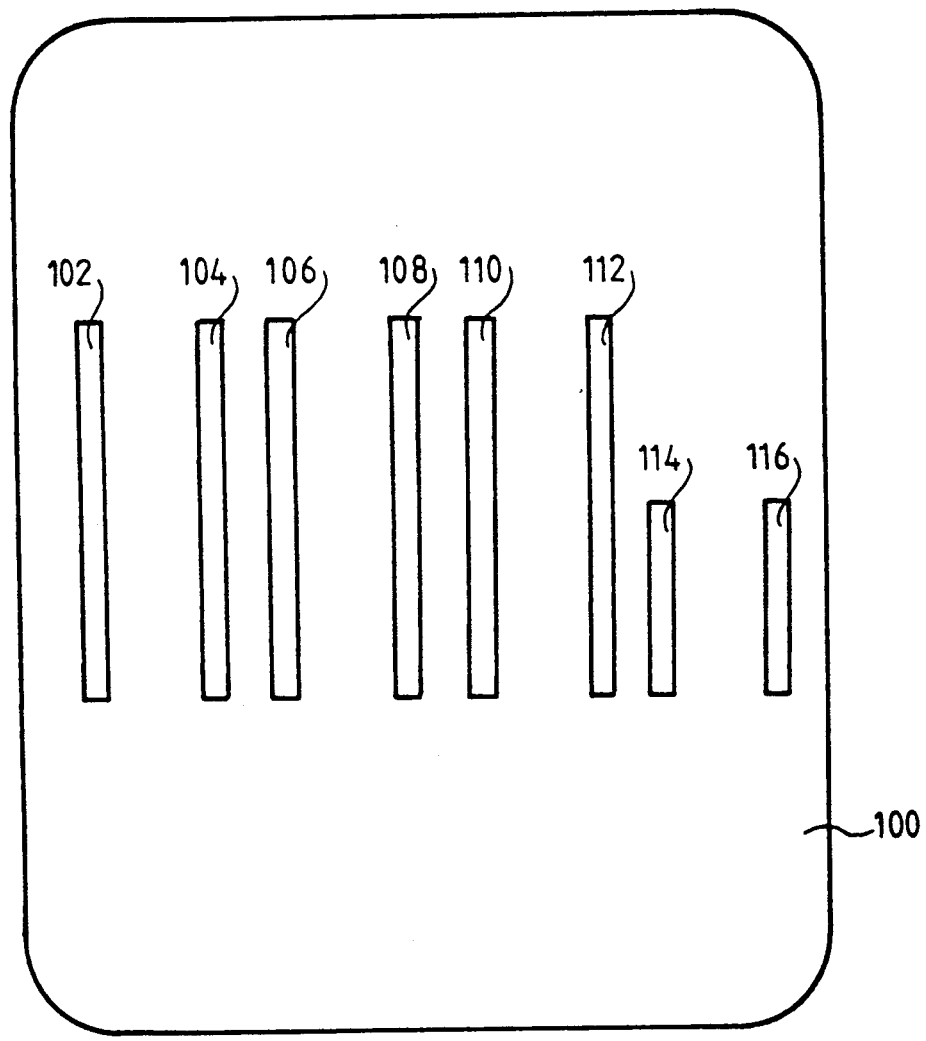
FIGS. 6a and 6b show one embodiment of the FIG. 5 electrical module.
Figure 6B:
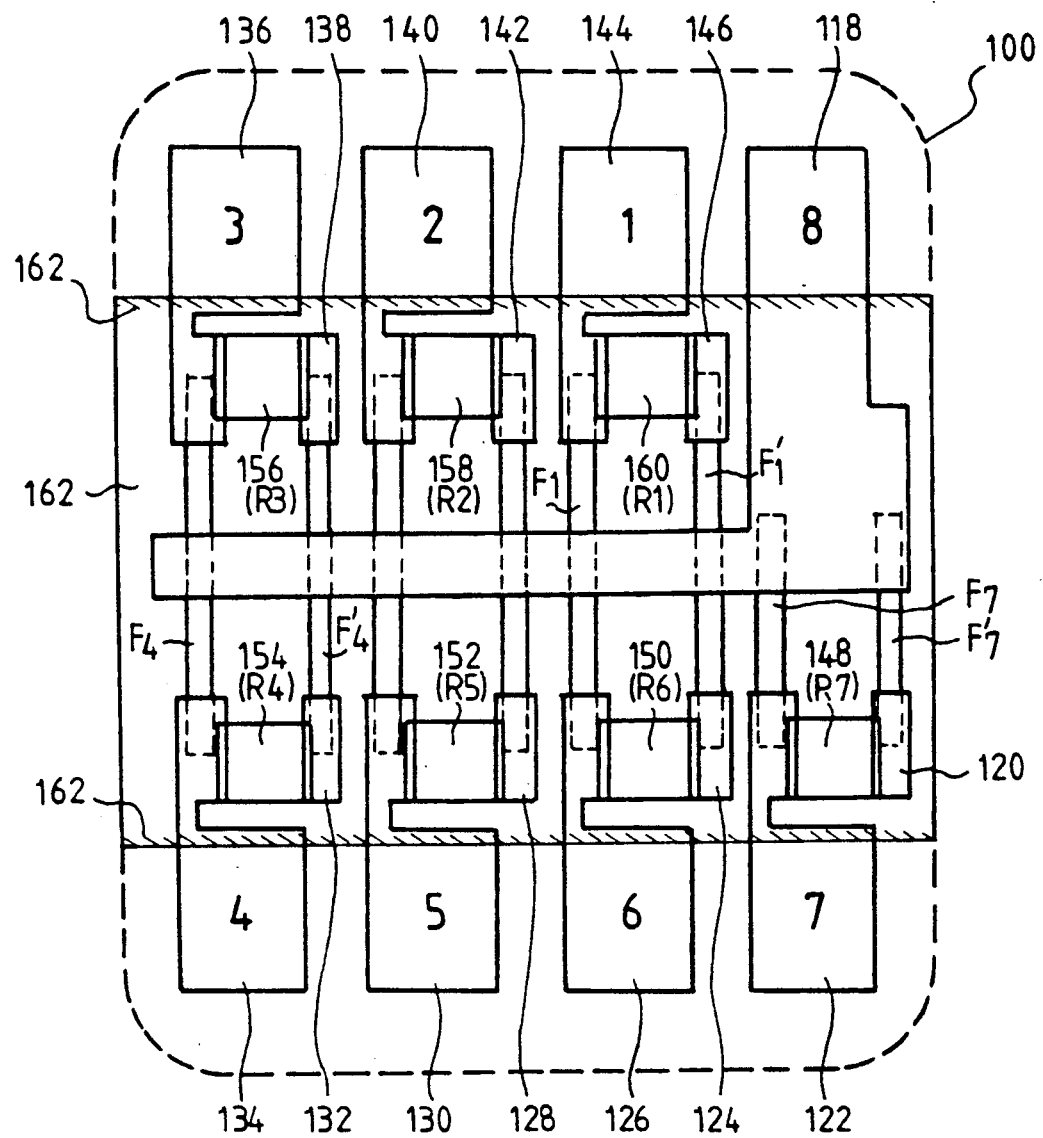

FIGS. 6a and 6b show a preferred embodiment of the electrical module in accordance with the invention. The starting material is an insulating support of plastic 100. Metallization strips 102 to 116 are formed on the support in order to form the fuses $F_1$ to $F_7$ and $F'_1$ to $F'_7$. In order to obtain well-defined fuses they are preferably made as follows. The starting material is a support sheet having a thin conducting sheet fixed thereon, e.g. a 500 Å thick sheet of aluminum. The assembly is placed on the support 100 so that the conducting sheet is in contact with the support 100. A tool reproducing the shape of the metallization strips 102 to 116 is applied against said sheet with appropriate amounts of pressure and temperature. The aluminum sheet is transferred, for the parts concerned, from the support sheet to the insulating support 100. Thereafter, a conducting material, e.g. based on silver, is silkscreen printed onto the surface of the support 100 to constitute the contact tabs 1 to 8, the fuses $F_1$ to $F_7$, the fuses $F'_1$ to $F'_7$, and the resistances $R_1$ to $R_7$. In FIG. 6b, this metallization bears references 118 to 146. In a second silkscreen printing stage a carbon based material is used to deposit conductors 148 to 160 which constitute the resistances $R_7$ to $R_1$. Finally, a third silkscreen printing operation is performed to apply an insulating layer 162 which covers the deposits formed during the previous stages, except over the external contact tabs 1 to 8.

This provides an electrical module which is very thin and which can be inserted in the body 10 of a card by well-known techniques. Naturally, a plurality of electrical modules are made, in practice, on a single support sheet. The sheet is then cut up in order to obtain individual electrical modules.

It should also be added that it is possible to provide a single card with several identical electrical modules. Returning to FIG. 1, the above-described techniques can be used to make a second electrical module bearing the reference 200. The module 200 occupies the same position relative to edges 32' and 34' as does the first electrical module relative to edges 32 and 34. This makes it possible to double the total number of memory cells. The card holder inserts the card with its edge 34 leading into a card reader until all of the memory cells in the first electrical module have been used up, after which the card is inserted with its edge 34' leading until the second electrical module is used up.

It should also be observed that instead of making the various deposits described with reference to FIGS. 6a and 6b on a support 100, it is possible to make them directly on the face 12 of the body of the card 10.

We claim:
1. A data medium comprising:
    a card body having a plane main face, said main face having the same dimensions as those of a main face of a standard electronic memory card, and a plurality of external electrical contact tabs including n external electrical contact tabs in said main face having the same position and the same dimensions as corresponding tabs of a standard electronic memory card, so that the external appearance of said plane main face is the same as that of the main face of a standard electronic memory card,
    a plurality of discrete electrical components including n−1 discrete electrical components, each of said n−1 electrical components having two electrical connectors, with one connector from all of said n−1 electrical components being coupled, respectively, to n−1 of said n external electrical contact tabs, the other connector of all of said n−1 electrical components being coupled to the remaining one external electrical contact tab of said n external electrical contact tabs, each said n−1 electrical components forming a memory cell,
    said electrical components and said conducting portions being embedded in the card body, with each electrical component having an initial electrical conduction state and at least one second irreversible electrical conduction state, said electrical components being such that upon application of a predetermined electrical write signal between the respective n−1 external electrical contact tabs associated with said respective electrical components and said remaining one of said n external electrical contact tabs produces said second conduction state; and
    wherein said plurality of discrete electrical components includes k(n−1) discrete electrical components organized in k series of discrete electrical components each of which is constituted by a fuse, with each fuse in any one series being mounted in series with a corresponding resistance, and with each fuse and resistance series connection being connected between said remaining one of the external tabs and a respective one of said n−1 external tabs, with the value of the resistances associated with each series of fuses being specific to that series, and wherein $K \geq 2$.

2. A system for handling data media according to claim 1, further including at least one device for processing data media, said device comprising a processing circuit, a connection assembly having n electrical contacts for establishing an electrical connection between said processing circuit and each of the n external electrical contact tabs of a data medium, when said medium is in a processing position, said processing circuit including controllable means for applying to the two contact tabs associated with said respective electrical components one of (a) said predetermined write electrical signal and (b) a read electrical signal which is not suitable for switching an electrical component from its said initial conduction state to its said second conduction state, and means for determining the conduction state of an electrical component when said read electrical signal is applied thereto.

3. A data medium according to claim 1, wherein said plurality of external electrical contact tabs comprises at least two identical sets of n external electrical contact tabs, each set being associated with said $n-1$ discrete electrical components.

* * * * *

UNITED STATES PATENT AND TRADEMARK OFFICE
CERTIFICATE OF CORRECTION

PATENT NO.    : 5,086,216
DATED         : February 4, 1992
INVENTOR(S)  : MOLLET et al It is certified that error appears in the above-identified patent and that said Letters Patent is hereby corrected as shown below:

Title page, Section [56] References Cited, right column, under "Foreign Patent Documents":

Change the French reference "577334" to --2,577,334--.

Signed and Sealed this

Sixth Day of July, 1993

*Attest:*

MICHAEL K. KIRK

*Attesting Officer*       Acting Commissioner of Patents and Trademarks